A. V. DISMORE.
TREATMENT OF IRON.
APPLICATION FILED JAN. 31, 1914.
1,141,530.
Patented June 1, 1915.
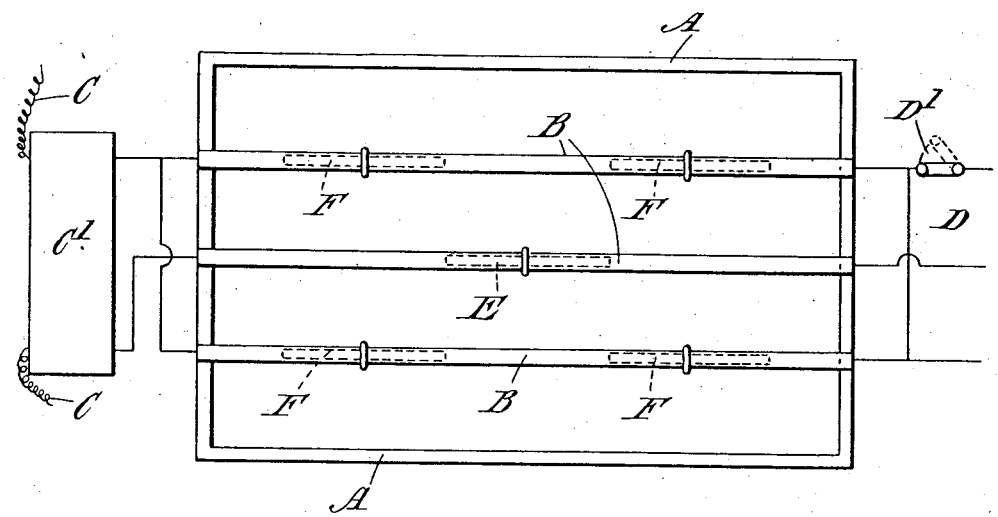
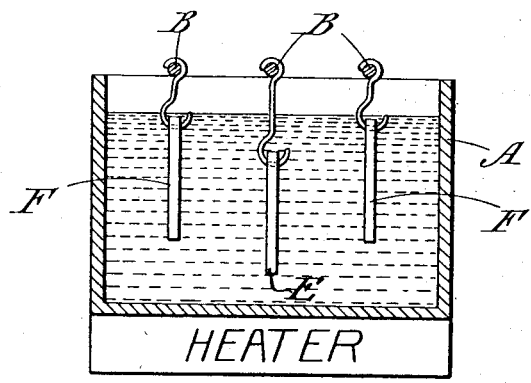
Witnesses.
Inventor.

UNITED STATES PATENT OFFICE.

ANGELO VACANI DISMORE, OF COUNTY OF BUCKINGHAM, ENGLAND.

TREATMENT OF IRON.

1,141,530.    Specification of Letters Patent.    Patented June 1, 1915.

Application filed January 31, 1914. Serial No. 815,667.

*To all whom it may concern:*

Be it known that I, ANGELO VACANI DISMORE, a subject of the King of England, residing at Buckinghamshire, England, have invented certain new and useful Improvements in the Treatment of Iron, of which the following is a specification.

The present invention is for improvements in or relating to the treatment of "iron" for the purpose of changing its characteristics. The term "iron" as used throughout the specification and claims is to be understood as including all qualities of cast-iron and wrought iron and also the poorer qualities of mild steel.

The process for the treatment of iron according to the present invention has for its object to change and improve the qualities thereof very considerably—to add to its malleability, ductility and tensile strength.

One feature of the invention consists in subjecting the iron to the action of an electrolytic bath wherein it is employed as one electrode and wherein the voltage is altered (for example increased) preferably suddenly during the progress of the action of the bath, it being considerably higher than normal plating voltage during part of the process.

According to another feature of the invention nickel and carbon are employed as the second electrode of the electrolytic bath, and in the preferred embodiment of the invention the iron forming one electrode of an electrolytic bath is situated intermediate of a mass of nickel and a mass of carbon, which together form the other electrode.

Other features of the invention will be more particularly pointed out hereinafter, and for a more complete understanding of the invention reference is directed to the accompanying drawings which illustrate one form of apparatus for carrying out the invention.

Figure 1 is a plan of a tank in which the treatment according to the present invention may be performed, with diagrammatic illustrations of the electrical connections, and Fig. 2 is a transverse sectional elevation of the tank.

Like letters of reference refer to like parts throughout the drawings.

The tank A which receives the electrolyte is of suitable construction to withstand the action of the chemicals employed therein. It may conveniently be a lead bath, lined (or otherwise) with matchboard internally. It is preferably of such a nature as to permit of the electrolyte being heated, either by means of electricity, gas or other heater as shown, to assist the action of the bath. Moreover a suitable device for agitating the electrolyte may be provided.

The electrolyte employed preferably comprises a solution of "nickel salts", bichlorid of platinum and sodium chlorid. "Nickel salts" is a well-known commercial term for a mixture of substances including nickel sulfate, neutral ammonium tartrate, and tannin and is often employed in solution as the electrolyte for nickel-plating baths.

In preparing the bath the ingredients may be employed in somewhat of the following proportions:—1 lb. of nickel salts, 3.75 grains of platinum bichlorid, 1¼ lbs. common salt (sodium chlorid), and 1 gallon of water. If the bath is allowed to become somewhat stale, it may conveniently be revivified by the addition of a solution consisting of suitable quantities of nickel ammonium sulfate, ammonia, and water.

Supported on the edges of the tank are bus-bars B which at one end are connected up to a source of low tension current C and at the other end are connected up to a source of high tension current D. In the apparatus illustrated in the drawings three bus-bars are employed, the middle one having hung thereon in the well-known way the piece of iron E to be treated, while one of the outside bus-bars carries one or more carbon electrodes and the other outside bus-bar carries one or more nickel electrodes. In the drawings the outside bus-bars are each shown as supporting two electrodes F. It will be seen that the iron to be treated is situated intermediate of the nickel and carbon electrodes.

The high tension circuit D is provided with a hand-controlled switch D', while the low tension circuit C is provided with an automatic switch which is diagrammatically illustrated at C'. This switch C' is so arranged that passage of low tension current through it does not disturb it, but passage of high tension current, from the source D, opens the switch and thereby automatically breaks the low tension circuit. The arrangement just described allows of a rapid change from low to high voltage being effected.

The low tension current may be supplied from any convenient source and may be at ordinary plating-bath voltage that is to say, about 6 volts, while the high tension current may be of any voltage up to say 1,000 volts, 250 volts having in some cases proved satisfactory. This voltage is, of course, considerably above the normal plating bath voltage. As low an amperage as possible is used in connection with the high tension current. The current density during the application of the low voltage current may be normal plating bath current density, while during the application of the high voltage current it will probably be much higher and will probably fluctuate or change considerably if the voltage be kept constant.

The bus-bar carrying the iron E is connected to the negative poles of the sources of current, while the bus-bars carrying the nickel and carbon electrodes F are connected to the positive poles thereof. Suitable indicating and regulating apparatus may be inserted in the various circuits in order to allow of the action of the bath being controlled at will.

The mass of iron E to be treated is first cleansed in any well-known manner in a separate bath to remove its extraneous impurities, such as grease, paint, etc., and the cleansed mass is then hung in position on its bus-bar. It will be seen that the iron E constitutes one electrode of the bath. Current is first supplied to the bath from the source of low tension current C and after a time the iron becomes coated with a film of nickel on its side adjacent the nickel electrodes, while the side adjacent the carbon electrodes is coated with a film of carbon. After this part of the process has been carried on a sufficiently long time and a sufficient amount of deposit has been obtained on the iron, the latter is turned around or reversed in the bath so that its side adjacent the nickel electrodes is brought adjacent the carbon electrodes, and its side adjacent the carbon electrodes brought adjacent the nickel electrodes. After this change in the position of the iron has been effected the low tension current may be left on for a time, but whether or not this is done, the high tension current is subsequently suddenly switched in by means of a switch D'. This will, when using an automatic switch on the low tension current as above described, immediately cut out the low tension current thereby preventing damage to the low tension apparatus, and will then commence its action upon the electrolyte and electrodes. As the action of the high tension current proceeds a strong gaseous evolution will be noticed while the surface of the iron will become altered in appearance. The action of the high tension current may have to be continued as long as three hours, the action being concluded when a steady reading on the indicating instruments is obtained; during the progress of the action the voltage across the electrodes in the tank fluctuates considerably.

After the above-mentioned treatment has been concluded the iron should be immersed in boiling water for cleansing purposes. It will be found to have acquired, during the treatment, the enhanced malleability, ductility and tensile strength referred to above.

The action is preferably only carried on to the degree hereinbefore referred to but the nickel and carbon electrodes should be approximately equal in area to the mass of iron being treated.

Although particular directions have been given as to the composition of the bath and the manner of carrying the invention into effect the details of the bath and of the process may be varied from time to time as may be found convenient and according to the grade of metal required or under treatment. For instance instead of using the low voltage current first, the high voltage current may be used first.

As already pointed out the invention may be applied to any kind of iron or steel, as besides imparting the qualities of steel equal to all sides of a piece of cast iron it may also be used, for example, to improve the quality of mild steel.

As regards the composition of the electrolyte, the following is a specific description of the manufacture and composition of a bath which has been used satisfactorily in actual practice in connection with small samples of iron—$35\frac{1}{2}$ ounces nickel sulfate, $26\frac{1}{2}$ ounces of neutral ammonium tartrate, and 77 grains of tannin—are added to 3 or 4 quarts of water and the mixture boiled for about a quarter of an hour, after which enough water is added to make up 20 quarts of fluid which is then filtered. To this solution there is then added a solution consisting of 0.35 ounce of nickel ammonium sulfate, $1\frac{3}{4}$ ounces ammonia (.880) and 1 quart of water. Following this addition a further addition is made of $1\frac{1}{4}$ lbs. of common salt per gallon of the solution obtained and 3.75 grains of platinum bichlorid per gallon of the solution obtained.

What I claim as my invention and desire to secure by Letters Patent is:—

1. The process of treating iron or steel to change its characteristics, which consists in subjecting it to the action of an electrolytic bath in which the piece to be treated forms an electrode, and passing through said electrode and bath a current of a voltage in excess of the ordinary range of voltages employed in electroplating work.

2. The method of treating iron or steel to change its characteristics, which consists in electrolytically depositing thereon a coating, and then subjecting the piece to an electrolytic bath in which it forms an electrode and while therein subjecting it to the action of a current of a voltage in excess of the ordinary range of voltages employed in electroplating work.

3. The method of treating iron or steel to change its characteristics, which consists in electrolytically depositing thereon a coating of carbon and nickel, and then subjecting the piece to an electrolytic bath in which it forms an electrode and while therein subjecting it to the action of a current of a voltage in excess of the ordinary range of voltages employed in electroplating work.

4. The process of treating iron and steel to change its physical characteristics, which consists in subjecting it to the action of an electrolytic bath in which it forms an electrode, and while in said bath subjecting it for a portion of the time to the action of a low tension current and for another period of time to a high tension current.

5. The process of treating iron and steel to change its physical characteristics, which consists in subjecting it to the action of an electrolytic bath in which it forms an electrode, and while in said bath subjecting it for a portion of the time to the action of a low tension current and for another period of time to a high tension current, and employing as other electrodes materials which will deposit a coating on the piece during its treatment.

6. The process for the treatment of iron for the purpose of changing its characteristics, according to which the iron is subjected to the action of an electrolytic bath wherein it is employed as one electrode, the voltage being considerably altered during the progress of the process.

7. The process for the treatment of iron for the purpose of changing its characteristics, according to which the iron is subjected to the action of an electrolytic bath wherein it is employed as one electrode, the voltage being altered during the progress of the process and being considerably higher than normal plating bath voltage during part of the process.

8. The process for the treatment of iron for the purpose of changing its characteristics, according to which the iron is subjected to the action of an electrolytic bath wherein it is employed as one electrode, the voltage being suddenly altered during the progress of the process and being considerably higher than normal plating bath voltage during part of the process.

9. The process for the treatment of iron for the purpose of changing its characteristics, according to which the iron is subjected to the action of an electrolytic bath wherein it is employed as one electrode, the voltage being increased, during the progress of the process, to a voltage considerably higher than normal plating bath voltage.

10. The process for the treatment of iron for the purpose of changing its characteristics, according to which the iron is subjected to the action of an electrolytic bath wherein it is employed as one electrode, the voltage being normal plating bath voltage during one part of the process and considerably higher than this during another part of the process.

11. The process for the treatment of iron for the purpose of changing its characteristics, according to which the iron is subjected to the action of an electrolytic bath, wherein it is employed as one electrode, the voltage being suddenly altered from normal plating bath voltage to a considerably higher voltage during the progress of the process.

12. The process for the treatment of iron for the purpose of changing its characteristics, according to which the iron is subjected to the action of an electrolytic bath wherein it is employed as one electrode, and nickel and carbon are employed as the second electrode, the voltage being altered during the progress of the process and being considerably higher than normal plating bath voltage during part of the process.

13. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, the voltage being altered during the progress of the process and being considerably higher than normal plating bath voltage during part of the process.

14. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being altered during the progress of the process and being considerably higher than normal plating bath voltage during part of the process.

15. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being considerably altered during the progress of the process.

16. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being altered from normal plating bath voltage to a considerably higher voltage during the progress of the process.

17. The process for the treatment of iron for the purpose of changing its characteristics, according to which the iron is subjected to the action of an electrolytic bath wherein it is employed as one electrode, and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being considerably altered after the position of the iron has been reversed.

18. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath considerably increased after the position of the iron has been reversed.

19. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being suddenly increased, after the position of the iron has been reversed, to a voltage considerably higher than normal plating bath voltage.

20. The process for the treatment of iron for the purpose of changing its characteristics, according to which the iron is subjected to the action of an electrolytic bath wherein it is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being normal plating bath voltage before the position of the iron has been reversed and considerably higher than this after the position of the iron has been reversed.

21. The process for the treatment of iron for the purpose of changing its characteristics, according to which the iron is subjected to the action of an electrolytic bath wherein the electrolyte employed comprises a solution of bichlorid of platinum, and wherein the iron is employed as one electrode, the voltage being altered during the progress of the process and being considerably higher than normal plating bath voltage during part of the process.

22. The process for the treatment of iron for the purpose of changing its characteristics, according to which the iron is subjected to the action of an electrolytic bath wherein the electrolyte employed comprises a solution of bichlorid of platinum, and wherein the iron is employed as one electrode, the voltage being altered from normal plating bath voltage to a considerably higher voltage during the progress of the process.

23. The process for the treatment of iron for the purpose of changing its characteristics, according to which the iron is subjected to the action of an electrolytic bath wherein the electrolyte employed comprises a solution of bichlorid of platinum, and wherein the iron is employed as one electrode, the voltage being suddenly altered from normal plating bath voltage to a considerably higher voltage during the progress of the process.

24. The process for the treatment of iron for the purpose of changing its characteristics, according to which the iron is subjected to the action of an electrolytic bath wherein the electrolyte employed comprises a solution of "nickel salts", bichlorid of platinum and sodium chlorid, and wherein the iron is employed as one electrode, the voltage being suddenly increased, during the progress of the process, to a voltage considerably higher than normal plating bath voltage.

25. The process for the treatment of iron for the purpose of changing its characteristics, according to which the iron is subjected to the action of an electrolytic bath wherein the electrolyte employed comprises a solution of "nickel salts", bichlorid of platinum and sodium chlorid, and wherein the iron is employed as one electrode, the voltage being normal plating bath voltage during one part of the process and considerably higher than this during another part of the process.

26. The process for the treatment of iron for the purpose of changing its characteristics, according to which the iron is subjected to the action of an electrolytic bath wherein the electrolyte employed comprises a solution of "nickel salts", bichlorid of platinum and sodium chlorid, and wherein the iron is employed as one electrode and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being altered after the position of the iron has been reversed, and being considerably higher than normal plating bath voltage during part of the process.

27. The process for the treatment of iron for the purpose of changing its characteristics, according to which the iron is subjected to the action of an electrolytic bath wherein the electrolyte employed comprises a solution of "nickel salts", bichlorid of platinum and sodium chlorid, and wherein the iron is employed as one electrode, and is situated intermediate of a mass of nickel and a mass of carbon which together form the second electrode, said iron being reversed in position during the process so that the side adjacent the nickel is brought adjacent the carbon and the side adjacent the carbon is brought adjacent the nickel, and the voltage of the bath being altered after the position of the iron has been reversed, and being considerably higher than normal plating bath voltage during the latter part of the process.

In testimony whereof I have signed my name to this specification in the presence of two subscribing witnesses.

ANGELO VACANI DISMORE.

Witnesses:
GEORGE WALKER PHILLIPS,
WILLIAM DANIEL MAYNARD.